I. FERTMAN AND H. KORETZKY.
BATTERY CONTAINER.
APPLICATION FILED DEC. 19, 1918.
1,316,567.
Patented Sept. 23, 1919.
2 SHEETS—SHEET 1.
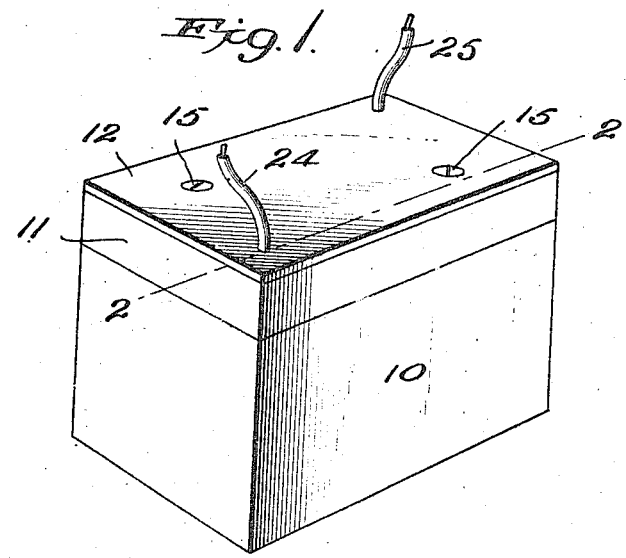
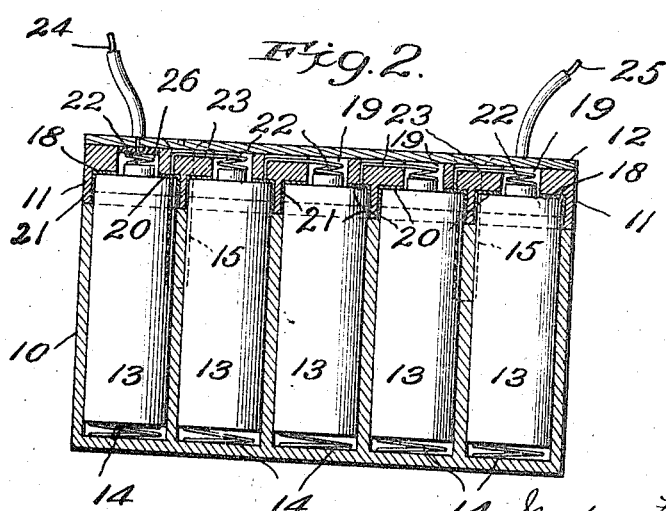
Isidor Fertman
Harry Koretzky
Inventors
By their Attorney

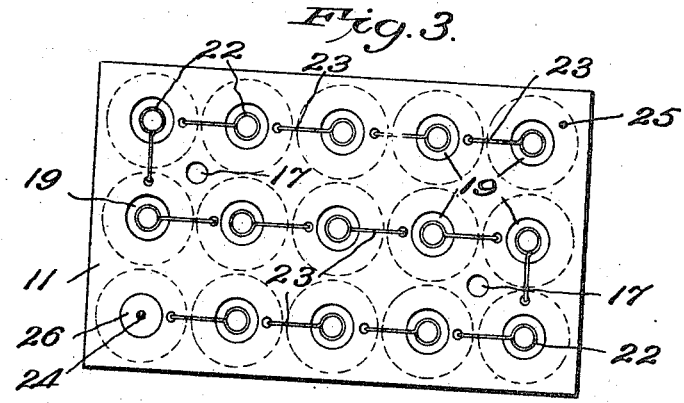
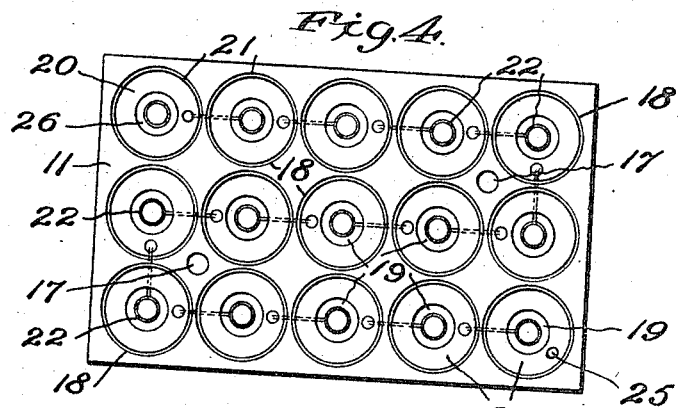
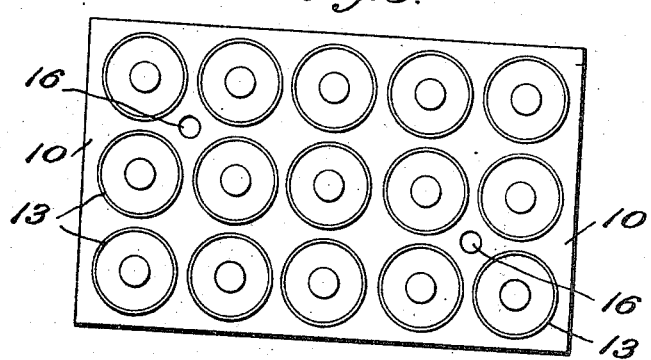
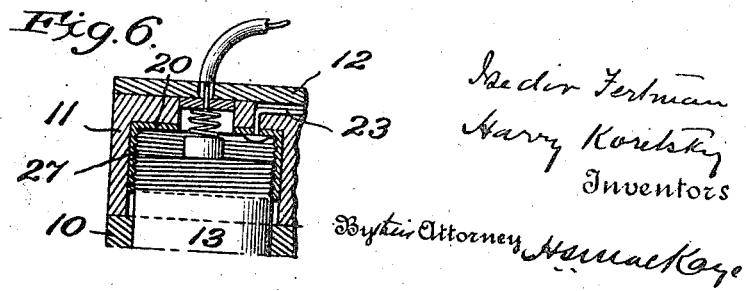

UNITED STATES PATENT OFFICE.

ISEDOR FERTMAN, OF NEW YORK, AND HARRY KORETZKY, OF BROOKLYN, NEW YORK.

BATTERY-CONTAINER.

1,316,567.  Specification of Letters Patent.  Patented Sept. 23, 1919.

Application filed December 19, 1918. Serial No. 267,456.

*To all whom it may concern:*

Be it known that we, ISEDOR FERTMAN and HARRY KORETZKY, both citizens of the United States, residing at New York, in the county of Bronx and State of New York, and at Brooklyn, Kings county, New York, respectively, have invented certain new and useful Improvements in Battery-Containers; and we do hereby declare the following to be a full, clear, and exact description of the invention, such as will enable others skilled in the art to which it appertains to make and use the same.

Our present invention relates to an improved container for electric battery cells of all kinds, but more particularly for batteries of dry cells such as are used for telephonic and other signaling and lighting purposes. In order to provide a secure and compact battery unit for such uses which shall be watertight and otherwise safe against accidental interior short circuits, it has been hitherto common to place the cells in a group within a watertight insulating container and, after arranging the necessary interior connections, to close and secure the whole by pouring a suitable sealing material over the whole group, which material hardens on cooling. The objection to this arrangement is that, where only one or two of the cells goes bad, the whole battery becomes useless and must be discarded, as the value of the remaining cells does not warrant the time and labor involved in opening the battery and identifying and removing the bad cells.

Our invention has for its principal object to provide a battery and container which, while just as secure, compact and convenient as those above described, shall also make it possible easily and quickly to identify and replace any cells that fall below the desired standard, thus preventing the loss of the entire battery when only a portion of the cells are defective.

Our container is so constructed that any unskilled person can assemble a battery within it, since the mere act of placing the cells in the sockets provided for them insures their being properly connected in circuit when the container is closed. These containers can be made of any desired shape or size, and of any suitable insulating material, such as fiber or hard rubber.

We have illustrated our invention by way of example in the accompanying drawings, wherein Figure 1 is a perspective view of a preferred form of assembled container and battery, Fig. 2 is a longitudinal sectional view of the same on the line 2—2 of Fig. 1, Figs. 3 and 4 are respectively a top and a bottom plan view of the connection plate, Fig. 5 is a plan view of the body containing the cells, with the connection plate and cover removed, and Fig. 6 is a sectional view of a modified form of battery cell connection which may be used.

The complete device comprises a body 10, a connection plate 11 and a cover 12, preferably consisting of a thin flat plate as shown. These parts are preferably made of hard rubber or equivalent material. The body 10 preferably consists of a solid block of the material named, which is cast or bored out to provide a number of rows of sockets into which the cells 13 fit snugly, each cell resting preferably upon a supporting spring 14 at the bottom of its socket. This serves to insure better electric contact at the top of each cell.

The various parts named may be held together by any suitable means, as by means of the screws 15 extending through the plates 11 and 12 and into threaded openings 16 between the sockets holding the cells. The openings in the connection plate which receive the screws 15 are shown at 17. We have shown three rows of five sockets each, but of course any number of rows and sockets will be within the scope of our invention.

The connection plate is preferably a flat member 11, fitting directly over the body 10 and bored or cast with cylindrical chambers 18 which register with the sockets in said body, and into which the tops of the cells project as shown in Fig. 2. An opening 19 is formed centrally at the top of each chamber 18, and an annular metallic terminal or contact plate 20 is fixed in the top of each chamber surrounding this opening. This annular terminal is preferably provided with a depending flange 21 set into the wall of the chamber (see Figs. 2, 3 and 4). When the whole is assembled, as in Figs. 1 and 2, the top of the external (usually zinc) cup of each cell makes firm contact with the plate 20 and its flange 21. The openings 19 are shown extending clear through the plate 11, but this is not essential. Each opening 19 is occupied by a terminal piece, preferably a spiral spring 22, and the permanent electric relations desired are obtained by suitably connecting the terminals 22 with the terminal plates 20. We have shown an arrangement wherein the cells are connected in series. For this purpose the end of each spiral 22 is prolonged to form a conductor 23, set into a groove in the plate 11, and extending down through the plate to make permanent connection with the annular plate 20 in the next chamber 18 (see Figs. 2 and 3).

It will thus be seen that, when assembled the central (usually carbon) poles or terminals of the cells make contact with the spring terminals 22, thus establishing a complete series connection throughout all the cells. Other relations of cells are produceable by variations in the permanent connections, as will be easily understood; and these are within our invention.

The general external connections are made through conductors, as 24 and 25. One of these, as 24, is connected with a metal piece 26 in contact with a central spring 22 at one end of the battery, while the other is connected with an annular plate 20 at the opposite end of the battery (see Figs. 2, 3 and 4). These external conductors pass through the cover plate 12.

In Fig. 6 is shown a modified form of connection between the cells and the terminals in the connection plate. Here each annular terminal 20 has a threaded cylindrical flange 27, and the external zinc cups of the cells are also threaded, so as to be screwed into the flanges 27. In this form the supporting springs 14 may be dispensed with.

It will be seen that our invention provides a container for automatic connection of battery cells, which can be rapidly and easily assembled, and whereby defective cells can easily be replaced by unskilled persons.

Various changes may be made in our apparatus without departing from the scope of our invention, and we do not limit ourselves to the details herein shown and described.

What we claim is:—

1. A container for dry battery cells comprising a body having cell-receiving sockets, a separable connection plate fitting over said body and provided with chambers adapted to receive the tops of the battery cells and surround the top portion of the external cell electrodes, said chambers having central openings, a resilient contact piece located in each of said central openings adapted to make contact with a central cell electrode, a second contact piece under said plate beside each opening adapted to make connection with an external cell electrode within the chamber surrounding it, electric connections between the various contact pieces on said plate, and means for holding said body and contact plate together when assembled.

2. The container set forth generally in claim 1 hereof, wherein the terminal plate in each chamber is provided with a downwardly extending flange adapted to fit around the corresponding battery cell.

3. The container set forth generally in claim 1 hereof wherein the central terminal in each chamber is a spiral spring prolonged to form a connection with the terminal plate in another chamber in the connection plate.

4. The container set forth generally in claim 1 hereof, wherein the means for holding the parts together comprise a cover and screws passing down through the cover and connection plate and into suitably threaded recesses in the body portion.

5. The container set forth generally in claim 1 hereof, wherein the terminal plate in each chamber has a depending threaded flange adapted to screw onto suitably threaded ends on the cells.

In testimony whereof, we affix our signatures.

ISEDOR FERTMAN.
HARRY KORETZKY.